May 25, 1943.　　　C. G. PULLIN　　　2,319,781
ROTARY WING AIRCRAFT
Filed May 25, 1940　　　2 Sheets-Sheet 1
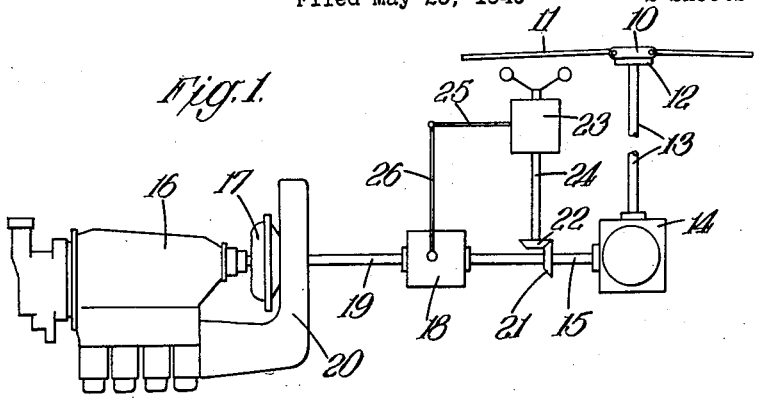
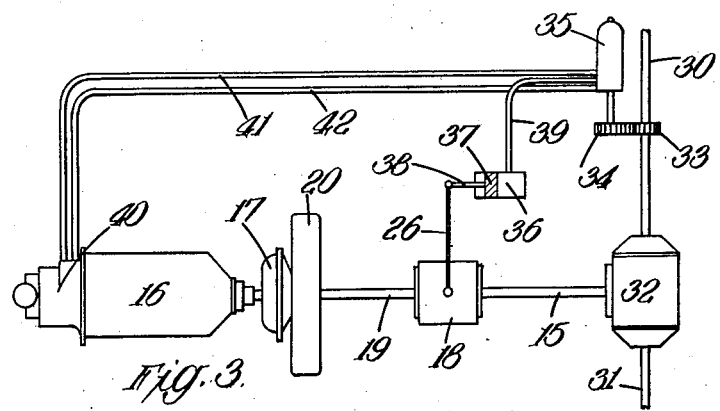
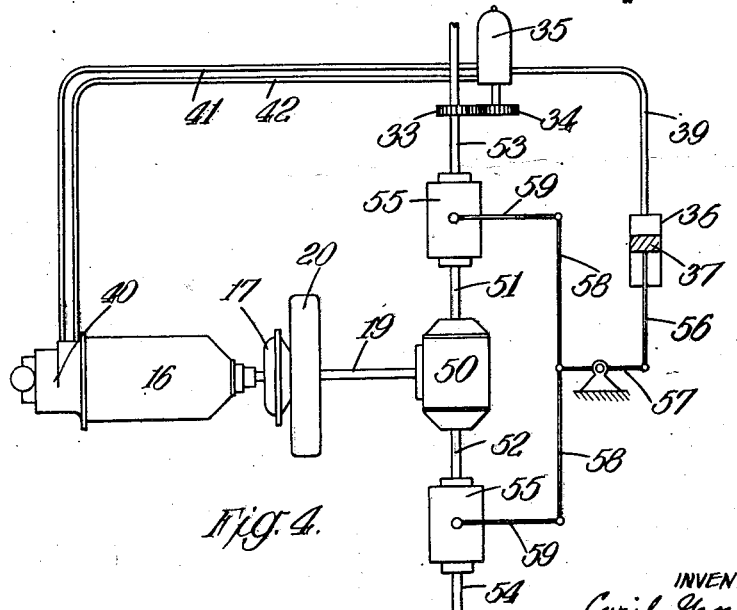
INVENTOR
Cyril George Pullin
ATTORNEYS

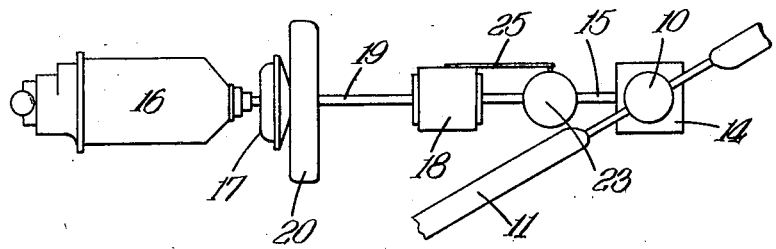
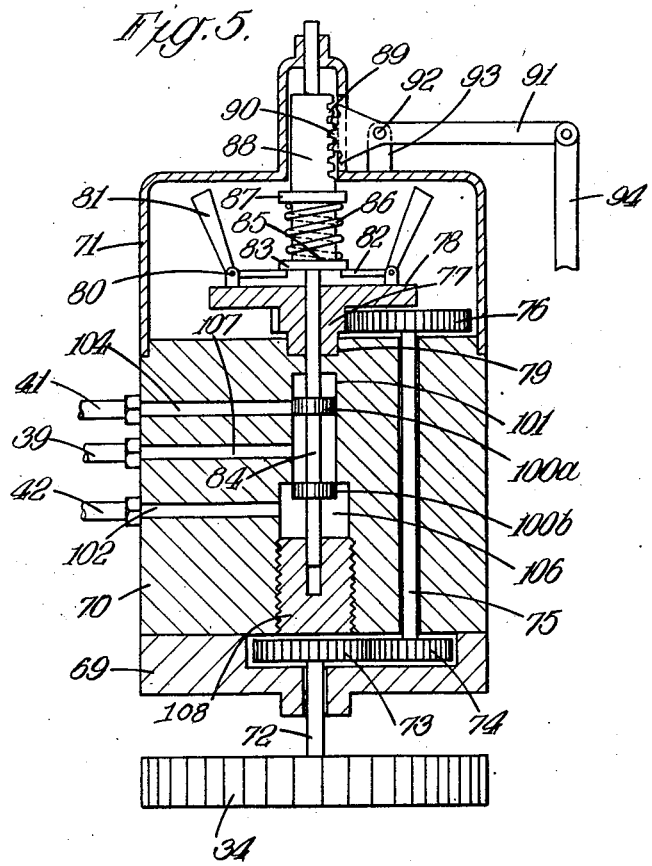

Patented May 25, 1943

2,319,781

UNITED STATES PATENT OFFICE 2,319,781

ROTARY WING AIRCRAFT

Cyril George Pullin, Genista, Newton Mearns, Scotland, assignor to Autogiro Company of America, Willow Grove, Pa., a corporation of Delaware Application May 25, 1940, Serial No. 337,172
In Great Britain March 18, 1939

11 Claims. (Cl. 244—17)

The present invention relates to rotative wing aircraft of the type having a sustaining rotor or rotors normally driven from a power unit or power units.

According to the present invention the power transmission system between a power unit and a rotor includes a variable speed gear, for instance a two-speed or three-speed gear, which may be operated manually or automatically as desired. Advantageously the selection of the gear is controlled by a centrifugal governor responsive to the speed of rotation of a rotor or of the power unit. The operative connection between the centrifugal governor and the variable speed gear may include a pressure fluid system.

The application of the invention to an aircraft will be better understood from the following description with reference to the accompanying drawings, which show by way of example three alternative arrangements.

In the drawings:

Fig. 1 is a diagrammatic elevational view showing the invention applied to an aircraft having a single sustaining rotor;

Fig. 2 is a plan view corresponding to Fig. 1;

Fig. 3 is a plan view of an alternative arrangement in an aircraft having a pair of sustaining rotors;

Fig. 4 shows a modification; and

Fig. 5 is a sectional view showing the construction of the constant speed unit referred to in Figs. 3 and 4.

Referring to Figs. 1 and 2. An aircraft has a single sustaining rotor with a hub 10 and blades 11 which is driven through a freewheel clutch 12 from a shaft 13 extending upwardly from a gearbox 14 which in turn is driven by a transmission shaft 15. Interposed between the shaft 15 and a power unit 16 is a fluid coupling 17, for instance of the Fottinger type, and a variable speed gear 18 which is connected to the fluid coupling by a shaft 19. Also mounted on the shaft 19 is a cooling air fan 20, which provides cooling air for the power unit.

The shaft 15 carries a bevel pinion 21 meshing with a similar pinion 22 by which a centrifugal governor 23 is driven through a shaft 24. The centrifugal governor controls through a link 25 the gear selector arm 26 of the variable speed gear 18.

The centrifugal governor 23 is arranged to select the gear ratio of the variable speed gear to maintain the speed of the shaft 15 and hence the speed of the rotor approximately constant. The variable speed gear box 18 may be of any suitable type, for instance it may have two, three or more speeds or may be of the infinitely variable type, but preferably it is of the two-speed type such as is used for the "over-drive" of automobiles. Such over-drive gears usually comprise an epicyclic system, the gear ratio of which is controlled by clutches.

In the arrangement shown in Fig. 3, the aircraft has a pair of sustaining rotors disposed on either side of the longitudinal axis of the aircraft and driven through shafts 30 and 31 from a gearbox 32 which is coupled to the power unit 16 by a transmission similar to that described with reference to Fig. 1 and in which like apparatus have the same reference numbers as in Figs. 1 and 2.

The shaft 30 carries a pinion 33 meshing with a second pinion 34 which drives a constant speed unit 35 connected by a pipe 39 to the relay cylinder 36. The unit 35 comprises a centrifugal governor controlling the operation of a valve which regulates the fluid pressure existing within the relay cylinder 36. The latter has a piston 37 which moves in response to the pressure to actuate the selector arm 26 of the variable speed gear 18 through a rod 38. Fluid under pressure is supplied to the constant speed unit 35 through a pipe 41 from a fluid pressure pump 40 mounted on the power unit while fluid can return to the sump of the pump 40 through a pipe 42. The constant speed unit 35 is connected to the relay cylinder 36 by a pipe 39.

The construction of the constant speed unit 35 is illustrated in Fig. 5.

The constant speed unit 35 driven from the rotor shaft 30 operates to select a gear ratio of the variable gear 18 which maintains the rotor speed approximately constant by either allowing pressure fluid from the pump 40 to be delivered through the pipes 41 and 39 to the relay cylinder or to be released from the relay cylinder through the pipe 39 to the pipe 42 and so returned to the sump of the pump.

Fig. 4 shows a modification in which two sustaining rotors are driven from a balance gear 50 through shafts 51 and 52 respectively coupled to shafts 53 and 54 by variable speed gears 55. The purpose of the balance gear 50 is to maintain substantial equality of the torque applied from the power unit to each of the rotors during normal flight, as disclosed in my copending British application No. 6,805 of 1939, and in the corresponding United States application Serial No. 331,318, filed April 24, 1940.

Mounted on the rotor drive shaft 53 is a pinion 33 meshing with a second pinion 34 driving a constant speed unit 35 which controls, as described with reference to Fig. 3 the fluid pressure within a relay cylinder 36 having a piston 37. The piston 37 is connected by a rod 56 to a lever 57 coupled by links 58 to the selector arms 59 of the variable speed gears 55 in the transmissions from the balance gear 50 to each of the rotors to select a gear ratio which maintains the rotor speeds approximately constant.

The constant speed unit referred to as 35 is diagrammatically illustrated in Fig. 5 which is a vertical section through the unit. It comprises a lower block 69, 70 and an upper casing part 71. The driving pinion 34 is mounted on a stub shaft 72 journalled in the block 69 and having at its upper end a pinion 73 meshing with a smaller pinion 74 at the lower end of a vertical rod 75 journalled in the block 70. At its upper end the rod 75 carries a gear wheel 76 meshing with a wheel 77 carried on the under surface of a plate 78 journalled at 79 in the block 70.

On its upper surface the plate 78 has lugs 80 on which are pivotally mounted the governor weights 81 having inward extensions 82 which engage the underside of a collar 83 at the upper end of a piston valve rod 84. Above the collar 83 is a spigot 85 to which is secured a coil spring 86 interposed between the collar 83 and a similar collar 87 carried by a member 88 having a rack 89 vertically slidable in an extension of the casing part 71.

The vertical position of the rack member 88 can be controlled by a toothed arc 90 which engages the rack 89 and which is mounted on an arm 91 pivoted at 92 to a lug 93 on the casing part 71. At its outer end the arm has a dependant link 94 coupled to a pilot's override control for the governor.

The piston rod 84 extends downward from the collar 83, through the centre of the plate 78 carrying the governor weights 81, into a vertical bore in the block 70. The piston rod 84 carries two pistons 100a and 100b which are slidable in an enlarged part of the vertical bore which forms a cylinder 101. An enlarged recess 106 below the cylinder 101 is connected by a duct 102 to the pipe 42 leading to an oil sump. Near the upper end of the cylinder 101 is a duct 104 leading to the pipe 41 extending to a pump 40 mounted on the power unit 16. The central part of the cylinder 101 between the pistons 100a and 100b is connected by a duct 107 to the pipe 39 connected to the relay cylinder 36. The lower end of the piston rod 84 is slidable in a bush 108 screwed into the block 70.

Th operation of the unit is as follows: The plate 78 carrying the governor weights 81 is driven by the wheels 77, 76, rod 75, pinions 74, 73, stub shaft 72 and pinion 34 from the pinion 33 mounted on the rotor shaft at a speed proportional to the rotor speed. Should this speed rise the governor weights 81 will tend to move outward, lifting by means of their extensions 82 the collar 83 against the action of the spring 86, thus lifting the piston rod 84 and uncovering the duct 104. This allows oil under pressure to flow from the oil pressure pipe 41 through the duct 104 and cylinder 101 to the duct 107 and pipe 39 to the relay cylinder 36 causing the piston 37 to move.

When the speed of the rotor returns to normal the piston 100a cuts off the supply of oil under pressure from the duct 104. On the other hand if the rotor speed falls the governor weights move inward under the action of the spring 86 allowing the piston rod 84 to move downward to put the enlargement 106 in communication with the duct 107. This allows oil from the relay cylinder 36 to pass through the pipe 39, duct 107 and the duct 102 and thence by the pipe 42 to a sump thereby reducing the oil pressure in the relay cylinder and allowing the piston 37 to move back. The system is so arranged that it tends to maintain constant rotor speed by selecting a gear ratio of the variable sped gear which most nearly gives a predetermined rotor speed.

The equilibrium speed of the governor unit can be adjusted by altering the initial pressure of the spring 86. When the dependant link 94 coupled to a pilot's control for alteration of the governor equilibrium speed is moved upward the teeth 90 at the opposite end of the arm 91 engaging the rack 89 cause the rack member 88 to move downward to compress the spring 86, thereby increasing the equilibrium speed of the governor and hence the mean rotor speed.

What I claim is:

1. In an aircraft, a plurality of sustaining rotors, a power unit, gearing driven from the power unit and a power transmission to each of the rotors from said gearing, a variable speed gear and a gear selector in each of said power transmissions and coupling means to actuate the gear selectors simultaneously.

2. In an aircraft, a plurality of sustaining rotors, a power unit, gearing driven from the power unit and a power transmission to each of the rotors from said gearing, a variable speed gear and a gear selector in each of said power transmissions, coupling means to actuate the gear selectors simultaneously and means responsive to the speed of the rotor power transmissions operative to select that gear ratio of the variable speed gear which most nearly tends to maintain a constant rotor speed.

3. In an aircraft, rotor means comprising at least one sustaining rotor, a power unit, a fluid coupling driven thereby, a variable speed gear driven from the fluid coupling and having a gear selector, a power transmission from the variable speed gear to the rotor means and a governor, driven from the transmission, operatively connected to the gear selector to select that gear ratio of the variable speed gear which more nearly tends to maintain the rotor speed at a selected value.

4. In an aircraft, rotor means comprising at least one sustaining rotor, a power unit, a fluid coupling driven thereby, a variable speed gear driven from the fluid coupling and having a gear selector, a power transmission from the variable speed gear to the rotor means, a relay cylinder having a piston coupled to the gear selector, a governor driven from the transmission, and a valve controlled by said governor regulating the fluid presure in the relay cylinder to select the gear ratio which more nearly tends to maintain the rotor speed constant at a selected value.

5. An aircraft including a pair of side-by-side oppositely rotating sustaining rotors, engine means for driving the rotors, rotor drive mechanism interconnecting the engine means and the rotors incorporating gearing for equalizing the torque between the two rotors, the rotor drive mechanism for each rotor including a variable speed transmission disposed in the drive between said gearing and the rotor, and governor means associated with one of said rotors and responsive to fluctuations in R. P. M. thereof to vary the transmission ratio in the two variable transmissions.

6. A construction according to claim 5, incorporating fluid coupling means in the rotor drive mechanism.

7. A construction according to claim 3, wherein two rotors are employed, together with torque-equalizing gearing between them.

8. A construction according to claim 3, with a manual control superimposed on the governor.

9. A construction according to claim 3, embodying a freewheel clutch.

10. In an aircraft having rotor means comprising at least one sustaining rotor and an engine for driving same, rotor drive mechanism interconnecting said engine and rotor and comprising an automatically-governed variable-ratio transmission, fluid coupling means between engine and transmission, and a freewheel clutch between said transmission and rotor.

11. The construction of claim 10, with a manual control for altering the transmission ratio.

CYRIL GEORGE PULLIN.